United States Patent
Fidan et al.

(10) Patent No.: US 10,315,464 B2
(45) Date of Patent: Jun. 11, 2019

(54) CAP PLY REINFORCEMENT STRIP IN PNEUMATIC TIRE

(71) Applicant: KORDSA GLOBAL ENDUSTRIYEL IPLIK VE KORD BEZI SANAYI VE TICARET ANONIM SŞIRKETI, Kocaeli (TR)

(72) Inventors: Sadettin Fidan, Garbsen (DE); Küşat Aksoy, Kocaeli (TR); Bekir Anil Mertol, Kocaeli (TR)

(73) Assignee: KORDSA GLOBAL ENDUSTRIVEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 234 days.

(21) Appl. No.: 14/909,140

(22) PCT Filed: May 27, 2014

(86) PCT No.: PCT/TR2014/000193
§ 371 (c)(1),
(2) Date: Jan. 31, 2016

(87) PCT Pub. No.: WO2015/016791
PCT Pub. Date: Feb. 5, 2015

(65) Prior Publication Data
US 2016/0297245 A1    Oct. 13, 2016

(30) Foreign Application Priority Data
Jul. 30, 2013 (TR) ................ a 2013/09219

(51) Int. Cl.
*B60C 9/18*    (2006.01)
*B60C 9/10*    (2006.01)
(Continued)

(52) U.S. Cl.
CPC ............ *B60C 9/1807* (2013.01); *B29D 30/08* (2013.01); *B60C 9/005* (2013.01); *B60C 9/11* (2013.01);
(Continued)

(58) Field of Classification Search
CPC .................... B60C 9/18; B60C 9/1807; B60C 2009/1814; B60C 9/10; B60C 9/11
See application file for complete search history.

(56) References Cited

U.S. PATENT DOCUMENTS 3,395,744 A * 8/1968 Wolf B ................. B60C 9/0042
139/420 R
3,603,071 A * 9/1971 O'Neil .................. B60C 9/0042
152/451
(Continued)

FOREIGN PATENT DOCUMENTS

EP    1371618    * 12/2003
EP    2439080 A1    4/2012
(Continued)

*Primary Examiner* — Justin R Fischer
(74) *Attorney, Agent, or Firm* — Gokalp Bayramoglu

(57) ABSTRACT

The cap ply reinforcement strip is a ready-to-use plain woven fabric and is composed of hybrid cord warps (3) and texturized weft yarns (2). The cap ply reinforcement strip for pneumatic tires (1) eliminates calendering and strip preparation steps by eliminating the need for rubber coating and decreases the rolling resistance of the tire and the fuel consumption.

20 Claims, 2 Drawing Sheets

Figure 1:
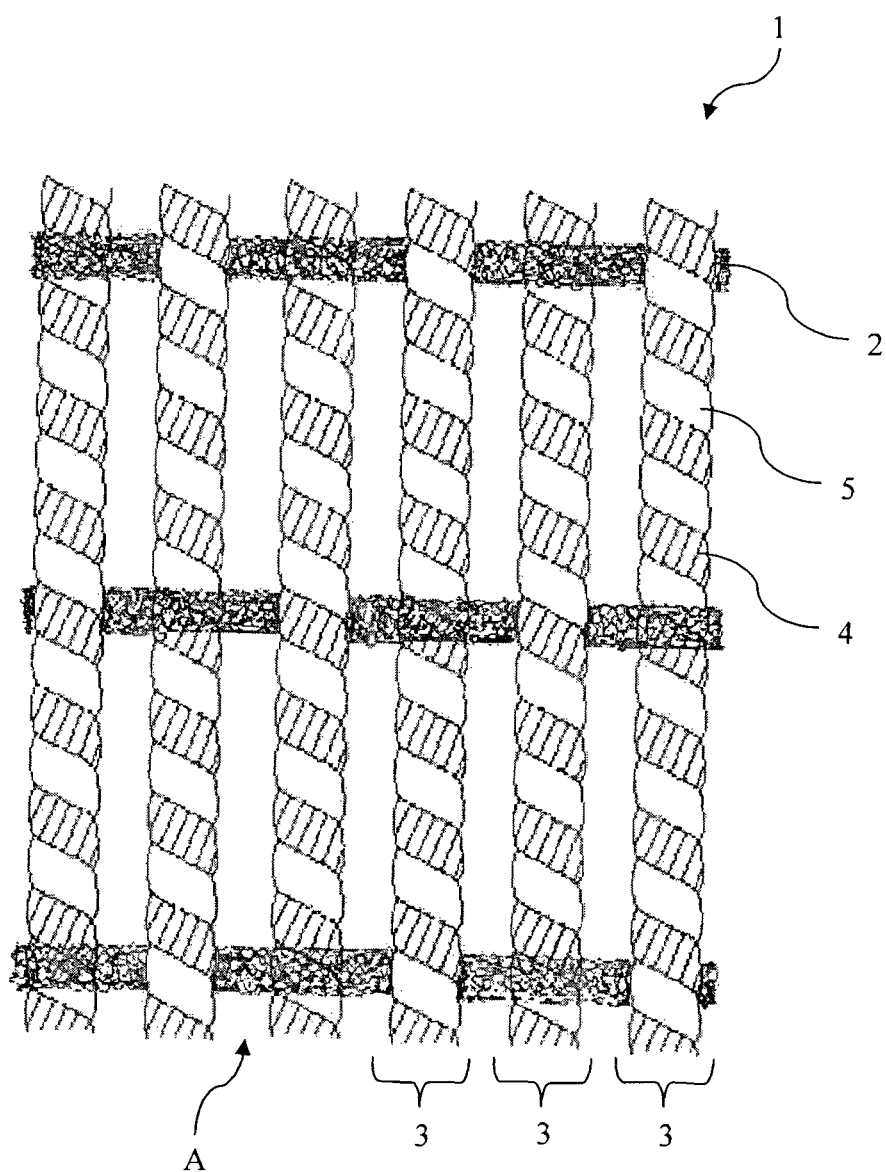

(51) Int. Cl.
*B60C 9/11* (2006.01)
*B60C 9/22* (2006.01)
*B60C 9/00* (2006.01)
*B29D 30/08* (2006.01)

(52) U.S. Cl.
CPC .......... *B60C 9/2204* (2013.01); *B60C 9/0064* (2013.01); *B60C 2009/0035* (2013.01); *B60C 2009/0071* (2013.01); *B60C 2009/0078* (2013.01); *B60C 2009/0092* (2013.01); *B60C 2009/2214* (2013.01); *B60C 2009/2261* (2013.01); *B60C 2009/2266* (2013.01); *B60C 2009/2285* (2013.01)

(56) References Cited

U.S. PATENT DOCUMENTS

| | | | | |
|---|---|---|---|---|
| 3,868,985 A | * | 3/1975 | Georges | C08J 5/06 152/451 |
| 4,506,717 A | * | 3/1985 | Thise-Fourgon | B60C 9/0028 139/420 C |
| 5,365,988 A | * | 11/1994 | Soderberg | B60C 9/2009 152/526 |
| 2007/0181238 A1 | | 8/2007 | Ternon et al. | |
| 2009/0294025 A1 | | 12/2009 | Michiels et al. | |
| 2012/0085477 A1 | * | 4/2012 | Donckels | B29D 30/16 152/556 |

FOREIGN PATENT DOCUMENTS

| | | | |
|---|---|---|---|
| EP | 2439081 A1 | | 4/2012 |
| JP | 61-113852 | * | 5/1986 |
| JP | 06176624 | * | 6/1994 |
| JP | 2011001661 A | | 1/2011 |
| JP | 2013043612 A | | 3/2013 |
| JP | 2013071368 A | | 4/2013 |
| KR | 860000149 | * | 2/1986 |
| WO | WO2011012454 A1 | | 2/2011 |
| WO | WO2011110622 A1 | | 9/2011 |
| WO | WO2012063180 A1 | | 5/2012 |

* cited by examiner

CAP PLY REINFORCEMENT STRIP IN PNEUMATIC TIRE

FIELD OF THE INVENTION

The present invention relates to cap ply reinforcement strip in pneumatic tire which is ready-to-use plain woven fabric and composed of the hybrid cords as warp and the texturized yarns as weft

BACKGROUND OF THE INVENTION

It is known that in radial tires the reinforcing material placed at small angles with the equatorial plane on belt package enhances the performance of the radial tire especially at high speeds.

Using hybrid cords as cap ply reinforcement by being wound on the belt package spirally as strips has been used for many years by several companies in order to improve high speed durability and handling performance in pneumatic radial tires. The said hybrid cord strips are obtained by cutting calendered (rubberized) cord fabric in strips or rubberizing parallel single cords in a certain width during extrusion process.

Hybrid cords are composed of at least two yarns (plies) having different properties (such as elastic modulus). For example, aramide-nylon hybrid cords are commonly used as cap ply reinforcement strip in pneumatic tires. The hybrid cords composed of two different yarns generally have two different tangent modulus zones. The initial low modulus zone is required for avoiding tight cord formations in geometric expansions during preparation and vulcanization of green tire and preventing the tight cord formations which could have cutting effect in the rubber. The high modulus zone is needed to prevent tire growth generated by the steel belt Package due to centrifugal force at high speeds. The tire growth causes the belt edge separation and cracks formed at the bottom of the tread grooves.

SUMMARY OF THE INVENTION

The objective of the present invention is to provide cap ply reinforcement strip in pneumatic tires wherein the parallel hybrid cord warps are plain woven with texturized weft yarns.

Another objective of the present invention is to provide a cap ply reinforcement strip in pneumatic tires wherein the tire production process is simplified by eliminating calendering and strip preparation stages by means of its dense (rubber-free) structure and/or the existing adhesive filling between the warps.

A further objective of the present invention is to provide cap ply reinforcement strip in pneumatic tires which enables to improve rolling resistance of the tire and decrease fuel consumption by elimination the need for rubber coating on the reinforcement strip by means of its dense structure (rubber-free) and/or the existing adhesive filling between the warps.

Yet another objective of the present invention is to provide a cap ply reinforcement strip in pneumatic tires wherein rubber transfer from the bottom side of the tread and upper side of the belt to the spacings between the parallel hybrid cords during vulcanization process is prevented by means of the adhesive RFL filling the spacing between parallel hybrid cords used as warp.

DETAILED DESCRIPTION OF THE INVENTION

"Cap ply reinforcement strip in pneumatic tires" developed to fulfill the objective of the present invention is illustrated in the accompanying figures wherein, FIG. 1 is the view of the inventive hybrid cord cap ply reinforcement strip having spacing between the warp cords (Version-1, A<1.5 mm).

Figure 2:
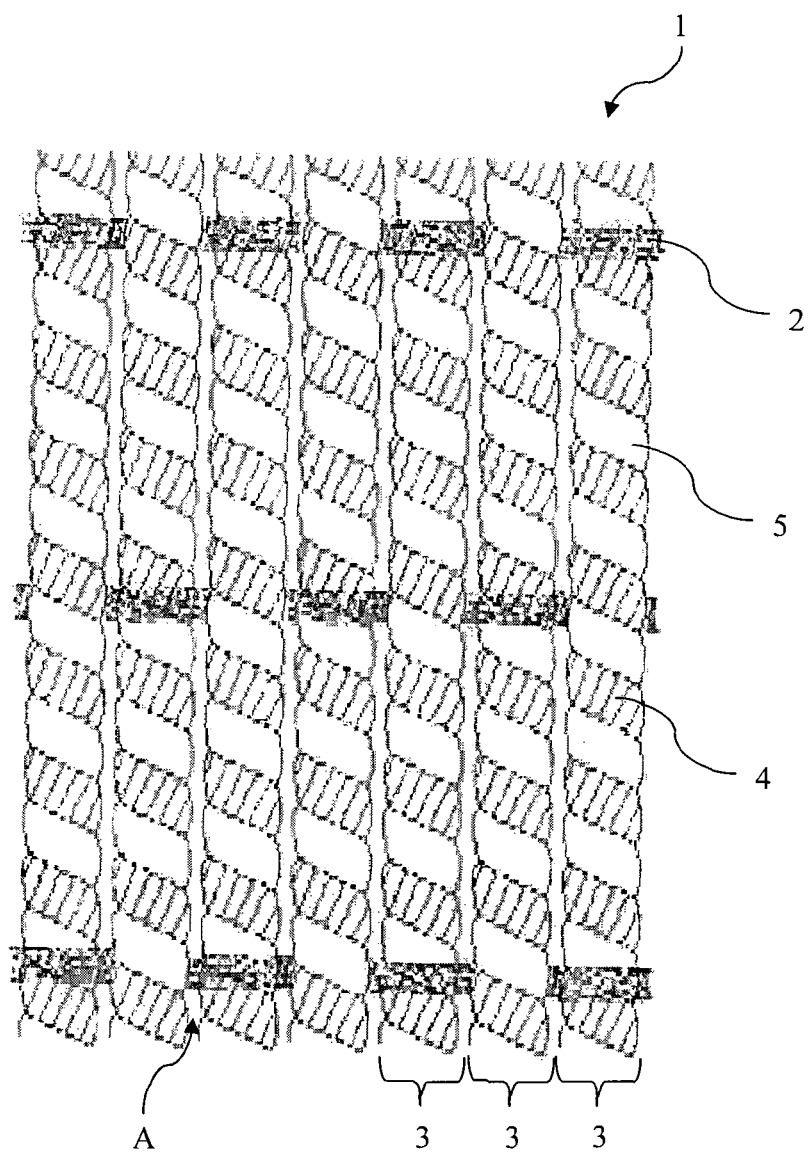

FIG. 2 is the view of the inventive hybrid cord cap ply reinforcement strip having zero or minimum spacing between the warp cords (Version-2, A<0.1 mm).

The components shown in the figures are each given reference numbers as follows:
1. Cap ply reinforcement strip
2. Texturized weft yarn
3. Hybrid cord warp
4. Yarn with high modulus
5. Yarn with low modulus
A. Spacing The inventive cap ply reinforcement strip in pneumatic tires (1) which eliminates calendering and strip preparation steps and enables to decrease the rolling resistance of the tire by eliminating the need for rubber coating and decrease the fuel consumption; comprises Texturized weft yarns (2) which are used as support members enabling the base structure to be kept together and which are parallel to each other with intervals, Hybrid cord warps (3) which are composed of at least one yarn with high modulus (4) and one yarn with low modulus (5), form plain woven structure by being passed vertically through the texturized weft yarns (2) parallel to each other, the spacings (A) between which are minimized and which are completely or partially filled with a tacky material (tacky RFL).

The width of the inventive cap ply reinforcement strip (1) varies between 5 to 30 mm, preferably 8 to 15 mm. The number of hybrid cord warps (3) within the width of 10 mm strip can vary between 5 to 20, or 50 to 200 within the width of 1 decimeter. The spacing between the hybrid cord warps (3) in the cap ply reinforcement strip (1) can vary between 0 to 1.5 mm, preferably 0.1 to 0.5 mm.

The cord twists of the hybrid cords (3) can vary between 100 to 800 tpm (twist per meter), preferably 250 to 350 tpm.

The linear densities of the ply yarns with low and high modulus in the hybrid cord warps (3) can vary between 200 to 3000 dtex, preferably 800 to 2000 dtex (the linear density in the yarns is expressed with dtex unit). Dtex is the expression of a 10.000 meter long yarn weight as gram. For example, 1400 dtex yarn means that the weight of the said 10.000 meter yarn is 1400 gram.

The yarns with high modulus (4) of the hybrid cords (3) used in the inventive cap ply reinforcement strip (1) can be aramide, carbon fiber, aromatic polyester such as vectran, rayon or PEN (polyethylene naphthalate), but it is preferably aramide. The yarns with low modulus (5) in the hybrid cords can be nylon 6.6, nylon 6 or PET (polyethylene terephthalate), but it is preferably nylon 6.6.

The hybrid cords (3) are composed of yarns (4, 5) with different elastic modulus. The texturized weft yarns (2) involving high amounts of RFL form strong bonds at the contact points with the warps (3). Therefore, separation of the hybrid cords (3) is eliminated.

The linear densities of the texturized weft yarns (2) can vary between 200 to 2000 dtex, preferably 500 to 1500 dtex.

The texturized yarns (2) used as weft can be twisted or non-twisted. The number of wefts in a 10 cm long strip can be 5 to 30, preferably 10 to 20.

The spacing (A) between the hybrid cords (3) can be empty or partially or totally filled with RFL adhesive.

The amount of RFL dip (Dip Pick Up, DPU %) in the cap ply reinforcement strip (1) can be 5% to 50% (by weight), preferably 5% to 25%, or more preferably 10% to 15%.

The reinforcement strip (1) comprises tacky adhesive on its outer surface which is needed for the tire production process. Texturized weft yarns (2) comprising high amounts of adhesive RFL make the parallel hybrid cords (3) stable by forming strong bonds at warp/weft contact points and fixing their positions. Therefore, the fraying and separation of the warps (3) in the strip (1) is prevented. By means of the adhesive RFL filling the spacing between the parallel hybrid cords (3) used as warp, rubber transfer to the said spacings from the upper belt and the lower parts of the tread is eliminated during vulcanization process.

The cap ply strip (1) can be spirally wound on the belt package in the tire with 0 to 5 degrees angle with the equatorial plane.

The invention claimed is:

1. A cap ply reinforcement strip for pneumatic tires, comprising:
  a plurality of texturized weft yarns provided parallel to each other with intervals and are used as support members enabling a base structure to be kept together, wherein the plurality of texturized weft yarns are prepared from at least one material selected from the group consisting of nylon 6.6, nylon 6, and polyethylene terephthalate (PET); and
  a plurality of hybrid cord warps comprising: at least one first yarn with a first modulus and at least one second yarn with a second modulus, wherein the first modulus is higher than the second modulus;
    wherein a plain woven structure is formed by passing the hybrid cord warps which are parallel to each other orthogonally through the texturized well yarns, and by a plurality of spacings between the hybrid cord warps being minimized and being completely filled with a tacky material (tacky Resorcinol Formaldehyde Latex);
    wherein the texturized weft yarns comprise Resorcinol Formaldehyde Latex at a plurality of contact points formed with the hybrid cord warps;
    wherein the cap ply reinforcement strip comprises Resorcinol Formaldehyde Latex (RFL) on an outer surface of the cap ply reinforcement strip, wherein a total amount of the Resorcinol Formaldehyde Latex (RFL) dip content (Dip Pick Up, DPU %) in the cap ply reinforcement strip ranges from 26% to 50%;
    wherein the cap ply reinforcement strip is rubber free and there is no rubber coating on the cap ply reinforcement strip.

2. The cap ply reinforcement strip in pneumatic tires according to claim 1, wherein a number of hybrid cord warps within a width of 10 cm ranges from 50 to 200.

3. The cap ply reinforcement strip in pneumatic tires according to claim 1, wherein the spacing between the hybrid cord warps ranges from 0 to 1.5 mm.

4. The cap ply reinforcement strip in pneumatic tires according to claim 3, wherein the spacing between the hybrid cord warps ranges from 0.1 to 0.5 mm.

5. The cap ply reinforcement strip in pneumatic tires according to claim 1, wherein linear densities of the first yarns and the second yarns ranges from 200 to 3000 dtex.

6. The cap ply reinforcement strip in pneumatic tires according to claim 5, wherein the linear densities of the first yarns and the second yarns ranges from 800 to 2000 dtex.

7. The cap ply reinforcement strip in pneumatic tires according to claim 1, wherein a cord twisting level of the hybrid cord warps ranges from 100 to 800 tpm (turns per meter).

8. The cap ply reinforcement strip in pneumatic tires according to claim 7, the cord twisting level of the hybrid cord warps ranges from 250 to 350 tpm.

9. The cap ply reinforcement strip in pneumatic tires according to claim 1, wherein the hybrid cord warps have the first yarn with high modulus prepared from at least one material selected from the group consisting of aramide, carbon fiber, glass fiber, aromatic polyester, rayon and PEN.

10. The cap ply reinforcement strip in pneumatic tires according to claim 9, wherein the hybrid cord warps have the first yarn with the first modulus prepared from aramide.

11. The cap ply reinforcement strip in pneumatic tires according to claim 1, wherein the hybrid cord warps have the second yarn with low modulus prepared from at least one material selected from the group consisting of nylon 6.6, nylon 6, and PET.

12. The cap ply reinforcement strip in pneumatic tires according to claim 1, wherein a linear density of the texturized weft yarn ranges from 200 to 2000 dtex.

13. The cap ply reinforcement strip in pneumatic tires according to claim 12, wherein the linear density of the texturized weft yarn ranges from 500 to 1500 dtex.

14. The cap ply reinforcement strip in pneumatic tires according to claim 1, wherein a number of weft of the texturized weft yarn within 10 cm length ranges from 5 to 30.

15. The cap ply reinforcement strip in pneumatic tires according to claim 14, wherein the number of well of the texturized weft yarn within 10 cm length ranges from 10 to 20.

16. The cap ply reinforcement strip in pneumatic tires according to claim 1, wherein the width of the cap ply reinforcement strip ranges from 5 to 30 mm.

17. The cap ply reinforcement strip in pneumatic tires according to claim 1, wherein the cap ply reinforcement strip is wound on a belt package in the tire spirally with an angle of 0 to 5 degrees with the equatorial plane.

18. The cap ply reinforcement strip in pneumatic tires according to claim 1, wherein the warp cords are produced from at least one material selected from the group consisting of nylon 6.6 and PET.

19. The cap ply reinforcement strip in pneumatic tires according to claim 1, wherein the warp cords comprise 2 to 7 monofilaments of nylon 6.6, PET, or both, wherein diameters of the monofilaments range from 0.1 to 1.0 mm.

20. A cap ply reinforcement strip for pneumatic tires, comprising:
  a plurality of texturized weft yarns provided parallel to each other with intervals and are used as support members enabling a base structure to be kept together, wherein the plurality of texturized weft yarns are prepared from at least one material selected from the group consisting of nylon 6.6, and nylon 6; and
  a plurality of hybrid cord warps comprising: at least one first yarn with a first modulus and at least one second yarn with a second modulus, wherein the first modulus is higher than the second modulus;
    wherein a plain woven structure is formed by passing the hybrid cord warps which are parallel to each other orthogonally through the texturized weft yarns, and by a plurality of spacings between the hybrid cord warps being minimized and being completely filled with a tacky material (tacky Resorcinol Formaldehyde Latex);

wherein the texturized weft yarns comprise Resorcinol Formaldehyde Latex at contact points with the hybrid cord warps;

wherein the cap ply reinforcement strip comprises Resorcinol Formaldehyde Latex (RFL) on an outer surface of the cap ply reinforcement strip, wherein a total amount of the Resorcinol Formaldehyde Latex (RFL) dip content (Dip Pick Up, DPU %) in the cap ply reinforcement strip ranges from 26% to 50%;

wherein the cap ply reinforcement strip is robber free and there is no rubber coating on the cap ply reinforcement strip.

* * * * *